United States Patent [19]

Fischer et al.

[11] 4,206,272

[45] Jun. 3, 1980

[54] ELECTROCHEMICAL STORAGE CELL

[75] Inventors: Wilfried Fischer, Neckargemünd; Wilhelm Haar, Sandhausen; Henner Meinhold, Heidelberg, all of Fed. Rep. of Germany

[73] Assignee: Brown, Boveri & Cie Aktiengesellschaft, Mannheim-Käfertel, Fed. Rep. of Germany

[21] Appl. No.: 33,808

[22] Filed: Apr. 27, 1979

[30] Foreign Application Priority Data

Apr. 29, 1978 [DE] Fed. Rep. of Germany ....... 2819027

[51] Int. Cl.² .......................................... H01M 10/50
[52] U.S. Cl. ........................................ 429/62; 429/72; 429/104; 429/120
[58] Field of Search .................... 429/62, 72, 104, 120

[56] References Cited

U.S. PATENT DOCUMENTS 3,837,918  9/1974  Nakabayashi ...................... 429/104

*Primary Examiner*—Charles F. LeFevour
*Attorney, Agent, or Firm*—Herbert L. Lerner

[57] ABSTRACT

Electrochemical storage cell with an anode chamber and a cathode chamber separated by a solid electrolyte. At least one of the chamber adjacent to the solid electrolyte and a supply chamber shield from both the solid electrolyte and the reaction chamber. At least one connected between the reaction chamber and the supply chamber for flow of reactants, and temperature controlled shut-off means for closing off the connection when a predetermined temperature above the operating temperature of the cell is reached.

23 Claims, 6 Drawing Figures

ELECTROCHEMICAL STORAGE CELL

BACKGROUND OF THE INVENTION

1. Field of the Invention

The invention relates to an electrochemical storage cell with at least two chamber (an anode chamber and a cathode chamber), separated by a solid electrolyte, for the accommodation of the reactants, at least one of the chambers being divided into a reaction chamber adjacent to the solid electrolyte and at least one supply chamber shielded against both the solid electrolyte and the reaction chamber.

2. Description of the Prior Art

In one known storage cell of this kind there is provided between a supply chamber and the reaction chamber a flow-limiting device which limits the flow of reactant from the supply chamber to the reaction chamber. The purpose of this arrangement is to prevent too rapid a reaction of the two reactants in case the solid electrolyte becomes damaged. In such an event, the entire reaction enthalpy of the reactants is converted into heat. This leads to a considerable temperature rise if the reaction is fast and, in particular, this temperature rise is steep when storage cells with small heat-radiating surface are involved. The consequence thereof would be either a severe increase of the vapor pressure of one of the reactants, causing the cell to burst, or the destruction of the housing due to the increased corrosion intensity at elevated temperature, thus allowing the reactants to escape from the storage cell.

In the known storage cell a small opening between supply chamber and reaction chamber is provided as a flow limiting device. The size of this opening has been selected so that sufficient reactant flow from the supply chamber to the reaction chamber is possible in normal storage cell operation while higher flow rates are restricted.

It is a disadvantage here that the size of the opening must be exactly matched to the respective size of the storage cell and its rated capacity and that an opening so matched does not permit a briefly increased reactant flow, as would be desirable, for example, to cover demand peaks for short periods of time. Beyond this, in case the solid electrolyte becomes damaged, the chemical reaction of the reactants will continue until the reactants are completely consumed. This, particularly in heavy duty storage cells containing large amounts of reactants and having a small heat-radiating surface, can ultimately lead to undesired temperature increases.

SUMMARY OF THE INVENTION

Therefore, it is an object of the invention to provide an electrochemical storage cell of the kind described at the outset which will not exceed a safe temperature limitation and to effect this in a simple and economical manner. Further, the storage cell should not only be able to meet the usual requirements occurring in operation, but in particular be capable also to cover brief demand peaks.

With the foregoing and other objects in view, there is provided in accordance with the invention an electrochemical storage cell with an anode chamber for containing an anolyte as a reactant and a cathode chamber for containing a catholyte as another reactant, with the anode chamber and the cathode chamber separated from each other, and with at least one of said chambers divided into a reaction chamber adjacent to the solid electrolyte shielded from both the solid electrolyte and a supply chamber shielded from both the solid electrolyte and the reaction chamber, the combination therewith of at least one connection disposed between the reaction chamber and the supply chamber for the flow of reactant from the supply chamber to the reaction chamber, and temperature-controlled shut-off means for closing off the connection to block the flow of reactant from the supply tank to the reaction chamber, the shut-off means being open to permit flow of reactant at the storage cell operating temperature and closing to block the flow of reactant at a predetermined temperature above the operating temperature.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
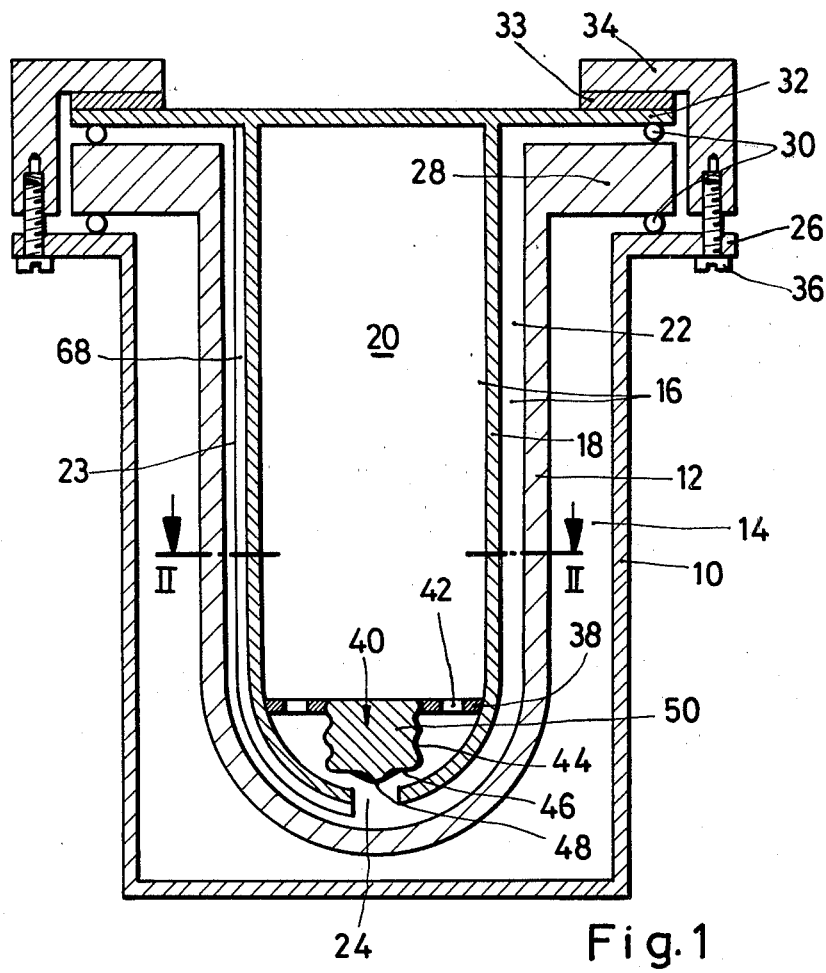
FIG. 1 diagrammatically illustrates a vertical section of a cup-shaped storage cell, the left half showing a variant of the partitioning wall design.

In accordance with the invention, there is disposed between reaction chamber and supply chamber at least one connection or passageway provided with a temperature-controlled shut-off device. The shut-off device at storage cell operating temperature clears the connection, i.e. does not obstruct or block the passageway, but at a preselected, in particular an increased limit temperature different from the operating temperature interrupts the connection, i.e. blocks the passageway. Thus, supply chamber and reaction chamber are connected via a shut-off device which is controlled by the temperature of the storage cell. If the storage cell operating temperature changes, reaching an impermissible limit, the shut-off device will separate the reaction chamber from the supply chamber. In consequence, no chemical reactions can take place after the small amount of reactants present in the reaction chamber is used up and, thereby, a further temperature variation, in particular a temperature increase, which could lead to dangerous and undesired operating conditions, is safely inhibited. Since the flow is unobstructed through the cross section of the shut-off device, it has no influence on the effectiveness of the temperature limitation. Thus, this free flow section can be designed for an unhindered passage of the reactant, making specific matching of the cross sectional flow area with the size of the cell and its rated capacity unnecessary.

If, for the sake of simplicity, only one of the chambers is divided, that chamber will be selected which contains the reaction partner whose ions migrate through the electrolyte to the other reaction chamber when discharging. In storage cells of the alkali metal type which employ for example, sodium as the anolyte and sulfur as the catholyte, this will ususally be the chamber for the alkali metal, i.e. the anode chamber.

To keep the amount of reactant present in the reaction chamber small on the one hand and have a cross section sufficient for the flow or the transport of the reactant for all cases on the other hand, the cross-sectional area of the reaction chamber is advantageously designed for an adequate transport of the reactant between supply chamber and solid electrolyte at peak load.

According to another advantageous embodiment of the invention, the reaction chamber may have at least one canal, emanating from the connection, for the additional transport and/or distribution of the reactant. Since the canal in this embodiment assumes the essential reactant transport from the connection into the reaction chamber, the cross section of the other reaction chamber areas can be very small because these areas, except at the connection, are additionally connected to the canal and are thus supplied with the reactant in two ways. For this purpose it is advantageous for the canal to extend into the reaction chamber area remote from the connection. The cross sectional area of the reaction chamber is a function of the volumetric capacity of the reaction chamber.

The canal may be a channel in the solid electrolyte, but it is more advantageous for the canal to be formed by a depression in the partitioning wall. Such a depression can easily be made, for instance, by pressing or embossing the partitioning wall, which wall usually consists of thin high-grade alloy steel.

In a particularly preferred embodiment of the invention, several canals, equally spaced, are distributed over the reaction chamber.

The shut-off device may be designed with any temperature control, but it is most simple if the shut-off device contains a temperature sensor with a filling which changes its volume when the temperature changes and causes the shut-off member to close. The shut-off device thus operates without auxiliary energy, whereby its operating reliability is increased and its construction simplified.

The shut-off device and the temperature sensor may advantageously form one structural unit, but it is sometimes better if the shut-off device and the temperature sensor are separate and connected to each other by a capillary. For, in this case the temperature sensor can be disposed at whichever spot shows a temperature change the fastest in the event of a storage cell malfunction.

The shut-off device is designed so as to be fully open within the operating temperature range and cause a quick shut-off only upon reaching the limit temperature i.e. the predetermined temperature. In order to have the storage cell under constant control after the shut-off device has responded, the latter is advantageously set to no longer be influenced by temperature changes of the storage cell after the shut-off.

A particularly preferred shut-off device which shuts off quickly after reaching the limit temperature is characterized by the feature that the shut-off device contains elastic, closed bellows which are deformed against their elastic resistance in the axial direction and kept in the deformed position by a filled-in medium which is solid up to the range of operating temperatures. The shut-off device in the deformed position clears the connection between reaction chamber and supply chamber, permitting ready flow of reactant therebetween. The solid medium is subject to a phase change, e.g. evaporation or melting, when the limit temperature is exceeded, and thereby releases the bellows to return into their undeformed position, shutting off the connection.

In this embodiment it is simplest if the one face of the bellows is designed as closing element, advantageously with a shut-off cone aligned with the connection. The bellows in this embodiment are advantageously deformed by compression.

In another, embodiment the bellows may be deformed by expansion and attaching a closing element to their face by means of a pin.

The bellows advantageously have in their interior a hook for the improvement of the temperature-depending inhibiting effect of the filled-in medium. One end of the hook is fastened to one face of the bellows and the other end of the hook is anchored in the solidified medium.

The phase change temperature of the medium present in the bellows must be matched to the respective storage cell operating temperature. If the limit temperature of the storage cell is approximately 420° C., zinc is advantageously used as the medium.

If the limit temperature is about 400° C., it is advantageous to use an alloy containing approximately 20 percent by weight silver (Ag), approximately 3 percent by weight copper (Cu), approximately 2 percent by weight zinc (Zn), and the balance tin (Sn). If a still lower limit temperature of approximately 380° C. is desired, it is advantageous to fill in sodium bromate ($NaBrO_3$) as the medium. Finally, if a limit temperature of approximately 445° C. is permitted, then lithium iodide (LiI) is filled in the bellows.

Further advantages of the invention are evident from the specification of embodiment examples below, in conjunction with the schematic drawings.

Identical parts in the various figures have the same reference symbols.

Figure 5:
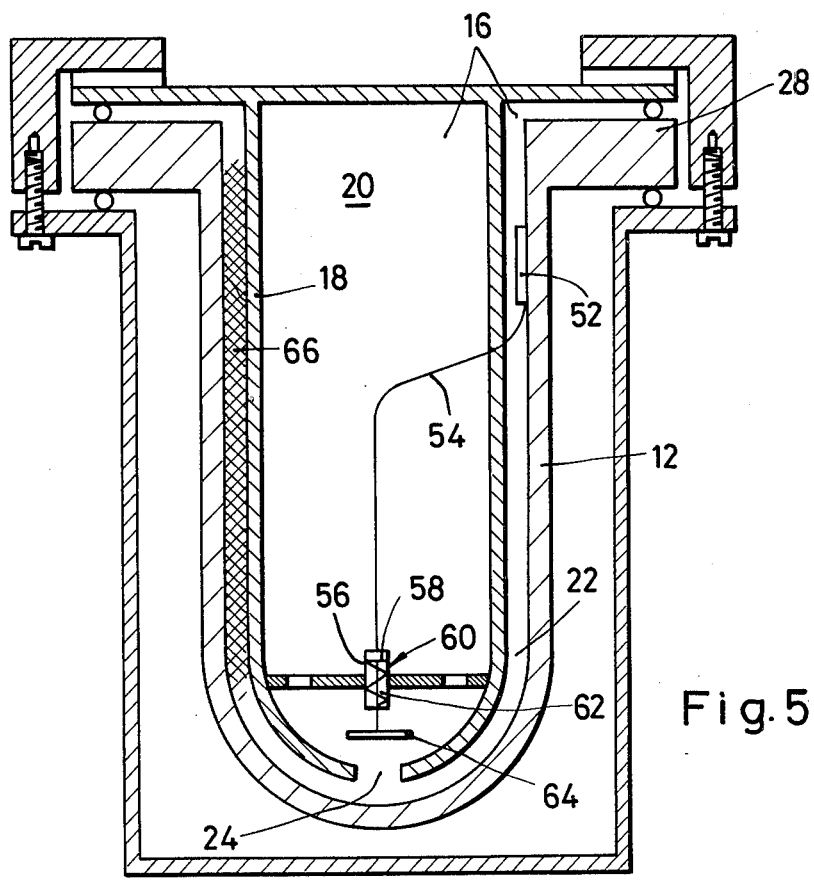
FIG. 5 diagrammatically illustrates a vertical section of another example of the cup-shaped storage cell.

The storage cell according to FIG. 1 has a cup-shaped housing 10 in which the crucible-shaped, solid electrolyte 12 is disposed so that a cup-shaped first chamber 14 is formed for the accommodation of a reactant. The interior of the solid electrolyte 12 forms a second chamber 16, provided for the accommodation of the second reactant. The second chamber 16 is divided into a supply chamber 20 and a reaction chamber 22 by a crucible-shaped separating wall 18. The separating wall 18 is narrowly spaced from the solid electrolyte 12 so that the volume of the supply chamber 20 is a multiple of the volume of the reaction chamber 22, generally the volumetric capacity of the supply chamber 20 is about 2 to 20 times larger than the volumetric capacity of the reaction chamber 22. To make this ratio as great as possible, the cross section of the reaction chamber 22 has been kept small. In designing this cross section it must be seen to it, however, that an adequate transport of the reactant contained in the supply chamber 20 through the connection 24 to the surface of the solid electrolyte 12 is still possible in the reaction chamber 22 at peak load. To promote this transport, a matrix with capillary action such as in the form of asbestos felt or metal wool may be provided in the reaction chamber 22, This matrix is not shown in FIG. 1 for the sake of clarity, but is indicated in FIG. 5 (part 66).

Figure 2:
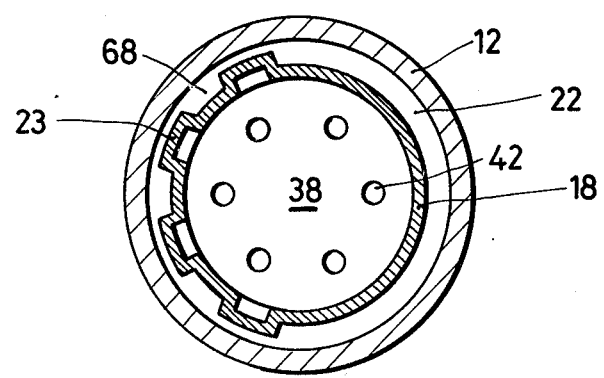
FIG. 2 is a transverse section taken along line II—II of FIG. 1.

The cylindrical separating wall 18 of FIG. 1 is depicted in two embodiments. As is particularly evident from the transverse section of FIG. 2, the right half is of smooth and cylindrical design and, together with the solid electrolyte 12, it defines the reaction chamber 22. Depending on the size of the storage cell, the distance between electrolyte and separating wall is about 0.5 to 5 mm, preferably 2 to 3 mm. The left half of the separating wall 18 has several, perhaps four to ten, preferably eight depressions or straight channels which are evenly distributed on the circumference of separating wall 18, run in the lengthwise direction of the separating wall 18 and extend to the connection 24. These depressions, forming canals 68, are pressed into the separating wall 18 consisting of thin, high-grade alloy steel. The canals are approximately 1.5 to 10 mm deep, preferably 4 to 7 mm. The peripheral areas 23 of the separating wall 18 between adjacent canals 68 are closer to the solid electrolyte 12. The cross-sectional area of the reaction chamber 22 is smaller in these areas 23 than in the other embodiment on the right half of FIG. 2. The distance between the areas 23 and the solid electrolyte 12 is about 0.1 to 1 mm, preferably 0.3 to 0.5 mm. The peripheral widths of the canals 68 and of the areas 23 are roughly equal. The constriction of the cross-sectional area is possible because the reactant transport takes place essentially in the canals 68, through which the other areas 23 of the reaction chamber 22 are supplied. It is through this design that the volume of the reaction chamber 22 can be kept small and yet an adequate supply of reactant can be assured. It goes without saying that only one embodiment will be supplied to one storage cell, either a smooth separating wall or a separating wall with canals.

It is of importance to arrange the reaction chamber so that a phase boundary surface as large as possible toward the other reactant is created, it being best if the reaction chamber adjoins the entire solid electrolyte surface.

Provided at the upper ends of the housing 10 and of the solid electrolyte 12 are outwardly oriented flanges 26 and 28, between which is inserted a ring-shaped gasket 30, made for example of aluminum. The crucible-shaped separating wall 18 is closed by a disc-shaped cover 32 whose edge rests on the flange 28 of the solid electrolyte 12, likewise with the interposition of a gasket 30. A tensioning device 34 is provided in order to hold the entire storage cell firmly together. Tensioning device 34, with the interposition of a ring 33 not conducting ions and electrons, presses the cover 32 and the flange 28 against the flange 26 of the housing 10 by means of screws 36.

Holding means 38 for the shut-off device 40 are disposed in the lower area of the supply chamber 20 in the vicinity of the connection 24 which is located at the tip of the crucible-shaped separating wall 18 and consists of an opening therein. In the embodiment example at hand, the holding means 38 are a corrosion resistant metallic wall, inserted transversely in the supply chamber 20 with a multiplicity of passage opening 42 so that transport of the reactant within the supply chamber is not impeded by the holding means 38.

The shut-off device 30 has closed, tubular bellows 44 whose one face is fastened to the holding means 38 whereas the other, free face 46 is roughly aligned centered with the opening 24 and has a closing cone 48 fitting aligned with the opening 24. The opening 24 is preferbly circular, with a 5 to 15 mm diameter. The bellows 44 is made of corrosion-resistant metal such as high-grade alloy steel and shaped as a corrugated tube which is spring-elastic in axial direction.

The interior of the bellows 44 contains a medium 50, e.g. a gas like nitrogen which expands when heated so that the bellows 44 will deform in the axial direction against its elastic resistance. Due to this process the shut-off cone 48 moves in the direction towards the connection 24 and ultimately closes it completely. When the medium 50 cools down, the process is reversed, i.e. the bellows 44 contract in the axial direction and the shut-off cone 48 clears the connection 24 again. To insure that the connection 24 is shut off securely, the latter may have a seat for the shut-off cone 48.

The axial length of the bellows 44 and the medium 50 are selected so that, in the range of the storage cell operating temperature, the connection 24 is free to let the reactant pass from the supply chamber 20 into the reaction chamber 22 and that, when the temperature rises to a limit of predetermined temperature, the connection 24 is shut off by the shut-off cone 48.

If it is intended to operate the storage cell depicted in FIG. 1 with sodium and sulfur as reactants, the sulfur or the sodium polysulfide will be filled into the first chamber 14. The housing 10 consists here of a corrosion-resistant material such as aluminum alloys or high-grade alloy steel, and at the same time serves as current lead-in or current lead-out to the reactant. Sodium as the second reactant is placed into the second chamber 16. The solid electrolyte 12 consists of beta-aluminum oxide. The crucible-shaped separating wall 18, projecting into the second chamber 16, the holding means 38 and the cover 32 consist of material, such as high-grade alloy steel, which is approximately 0.3 to 1 mm thick. The material is resistant to the corrosive effect of sodium, and at the same time serves as current collectors. Since the cylindrical separating wall 18 extends to near the bottom of the crucible-shaped solid electrolyte 12, the latter is still in contact with the rest of sodium collected on the bottom surface until the reactant is virtually used up. A typical storage cell of this kind has a solid electrolyte 15 to 40 mm in diameter and 100 to 400 mm high.

Storage cells of the sodium-and-sulfur type have operating temperatures ranging roughly between 300° C. and 350° C. But should the solid electrolyte 12 develop a defect such as a fracture so that sodium and sulfur come in direct contact with each other, the reaction enthalpy then occurring is transformed into heat. This can lead to a steep high temperature increase such that the vapor pressure in the storage cell rises, leading to a bursting of the storage cell. Also, an impermissibly high storage cell temperature leads to increased corrosion of the housing so that there is the danger of leakage of the reactant.

For these reasons, the medium 50 of the shut-off device 40 is selected so that the connection 24 is cleared in the operating temperature range between 300° and 350° C. and is shut off by the shut-off device 40 only when the temperature rises further to, say, 400° C. In this case, the majority of the sodium located in the supply chamber 20 is separated from the small amount of sodium in the reaction chamber 22. In case of a destruction of the solid electrolyte 12, therefore, only this relatively small amount of sodium in the reaction chamber 22 can react chemically with the sulfur in the chamber 14 so that the temperature rise remains within permissible limits and increased corrosion is prevented.

Of course, the sulfur or the sodium polysulfide may also be put into the second chamber 16 and the sodium into the first chamber 14. The situation is then analogous. By the same token, other reactants may be used after appropriate adaptation, or both chambers 14 and 16 may be divided.

The bellows 44 of the present embodiment example serve at the same time as temperature sensor for the shut-off device 40, i.e. the shut-off device is actuated as a function of the temperature in the lower area of the supply chamber 20. Since the chemical reactions leading to undesired temperature increases take place mainly in the area of the solid electrolyte, as in the event of a fracture, for instance, the shut-off device 40 will respond only after a delay because a certain time is required for the transport of heat from the solid electrolyte to the bellows 44. This delays shutting off the connection 24 somewhat, which usually is no disadvantage or can be compensated for by setting a lower limit temperature.

But if this is to be avoided, then, according to the variant of FIG. 5, the shut-off device 60 has a separate sensor 52, connected via a capillary 54. The sensor 52 is disposed near or directly on the solid electrolyte 12, in particular at a spot where, according to experience, a fracture is likely to occur, for instance in the vicinity of the flange 28. Due to this location, the temperature increase is picked up directly at the site of its origin and the shut-off device is actuated without delay. The shut-off device comprises a cylinder 56 with a piston 58 which is acted upon by the medium disposed in the sensor 52 when the medium expands through the capillary 54. This causes the disc-shaped closing member 64 attached to the piston 58 to be moved against the resistance of the interspersed spring 62 in the direction of the connection 24, closing it.

Shown in the reaction chamber 22 on the left half of FIG. 5 is the matrix 66 with capillary action which extends over the entire reaction chamber 22 and is not shown in its entirety for greater clarity.

Figure 3:
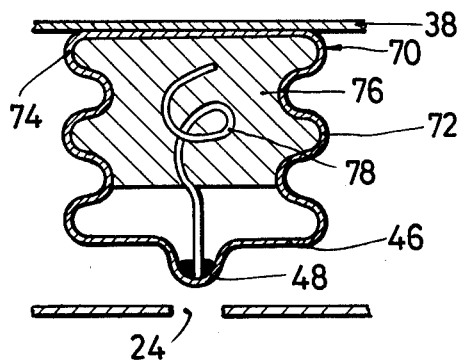
FIG. 3 shows a variant of a shut-off device, in more detail, in larger scale as a vertical section.
Figure 4:
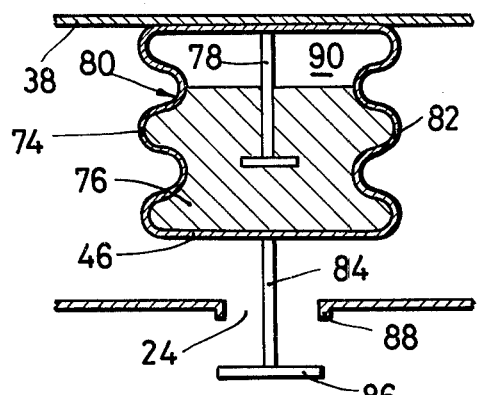
FIG. 4 is a vertical section of another variant of a shut-off device.

While the shut-off devices according to the embodiment examples of FIGS. 1 and 5 close gradually when the temperature rises and reopen when the temperature drops, FIGS. 3 and 4 depict variants of shut-off devices as details and in larger scale, by means of which a quick shut-off of the connection 24 occurs only when the limit temperature is reached and exceeded. These variants will be preferred because the connection 24 is completely free in the entire range of operating temperatures.

The shut-off device 70 according to FIG. 3 also has elastic, tubular, closed bellows 72 whose free face 46 is provided with a central shut-off cone 48 which is in alignment with the connection 24, exactly as in the embodiment example according to FIG. 1. The difference between it and the shut-off device 40 of FIG. 1 is, however, that the bellows 72 are compressed in the axial direction against the elastic resistance of its folds or corrugations and that, in this condition, the interior of the bellows 72 is filled with a liquid medium which enters the corrugations 74 and solidifies into a solid body at ambient temperature. This causes the bellows 72 to retain their compressed position. The filled-in medium 76 has the characteristic of remaining solid up to the range of the storage cell operating temperatures, melting or evaporating only when the storage cell overheats, i.e. at the limit temperature. This releases the bellows 72 so that they spring back into their original shape, i.e. the bellows perform a motion in the axial direction and become longer, thereby closing the associated connection 24 by means of the shut-off cone 48.

To be able to retain the bellows 72 even better in their compressed state, a hook 78 is additionally provided. One end of the hook 78 is fastened to the inside of the bellows 72 in the area of the shut-off cone 48 whereas its other end is of cork-screw shape and anchored in the solid medium 76.

Since the shutting-off process of the shut-off device 70 according to FIG. 3 is not reversible, the connection 24 remains closed permanently after the shut-off device 70 responds. The advantage thereof is that the defective storage cell is taken out of operation permanently.

FIG. 4 shows a variant of the shut-off device of FIG. 3. Here, the bellows 82 of the shut-off device 80 has been pulled apart, i.e. extended in the axial direction against the elastic resistance of the corrugations 74 before the solidifying medium 76 was filled in. When the medium 76 melts, the bellows 82 are released and contract into its original shape. In so doing, the disc-shaped closing element 86 fastened to the face 46 is moved towards a seat 88 provided on the connection 24, shutting off the latter. The shut-off element 86 is fastened to the face 46 by means of a pin 84 penetrating the connection 24.

In addition, a hook 78 may also be provided. As may be seen in FIG. 4, it is in the form of a cross and fastened to the upper face of the spring bellows 82.

Another empty space 90 must be provided inside the spring bellows 82 to accommodate the molten or evaporated medium 76 when the spring bellows 82 contract. Such an empty space is also advantageous in the shut-off device according to FIG. 3 and shown in the drawing.

Figure 6:
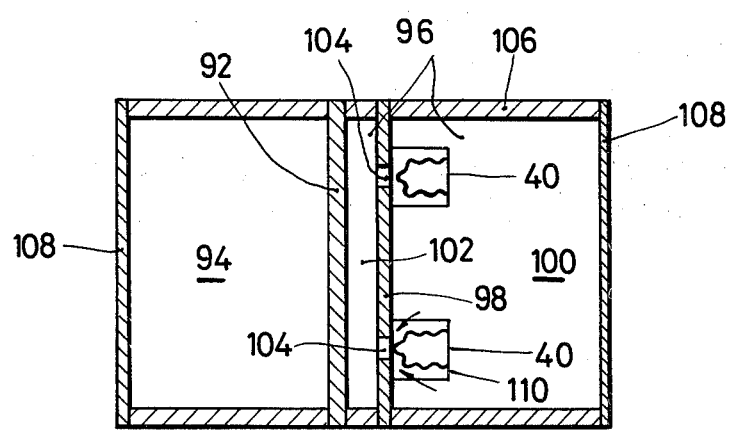
FIG. 6 is a vertical section of a storage cell with a disc-shaped, solid electrolyte.

FIG. 6 depicts a storage cell with reactant chambers 94, 96 juxtaposed in a row. The first chamber 94 is roughly square and separated from a likewise square chamber 96 by a disc-shaped solid electrolyte 92. This chamber 96 is divided by a disc-shaped partitioning wall into a supply chamber 100 and a reaction chamber 102. Outwardly, the chambers 94 and 96 are bounded by insulating parts 106 and metal walls 108 serving as current lead-in and lead-out.

Two connections 104, one disposed in the lower and one in the upper area of the partitioning wall 98, are provided to connect the supply chamber 100 and the reaction chamber 102. These connections are equipped with shut-off devices 40, each fastened to a narrow clip 110 which bridges the connections 104. Providing several connections has the advantage that it improves the replenishment of the reactant from the supply chamber 100 into the reaction chamber 102. If required, the storage cells according to FIGS. 1 and 5 could also be provided with a second connection.

Like the storage cell according to FIG. 1, the partitioning wall 98 may be provided with canals not shown, emanating from the connections 104 and radiating across the partitioning wall. As to dimensions, the guide values given in connection with FIG. 1 also apply here.

There is claimed:

1. An electrochemical storage cell with an anode chamber containing an anolyte as a reactant and a cathode chamber containing a catholyte as another reactant, with the anode chamber and the cathode chamber separated from each other by a solid electrolyte, and with at least one of said chambers divided into a reaction chamber adjacent to the solid electrolyte and a supply chamber shielded from both the solid electrolyte and the reaction chamber, the combination therewith of at least one connection disposed between the reaction chamber and the supply chamber for the flow of reactant from the supply chamber to the reaction chamber, and temperature-controlled shut-off means for closing off the connection to block the flow of reactant from the supply chamber to the reaction chamber, the shut-off means being open to permit flow of reactant from the supply chamber to the reaction chamber, the shut-off means being open to permit flow of reactant at the storage cell operating temperature and closing to block the flow of reactant at a pedetermined temperature above the operating temperature.

2. Storage cell according to claim 1, wherein the cross sectional area of the reaction chamber is an area to provide the reaction chamber with a volume only approximately sufficient for an adequate transport of the reactant between the supply chamber and the solid electrolyte at peak load.

3. Storage cell according to claim 1, wherein the reaction chamber is separated from the supply chamber by a partitioning wall, and wherein the partitioning wall on the reaction chamber side has at least one canal, emanating from the area of the connection, for the transport and distribution of the reactant.

4. Storage cell according to claim 3, wherein the canal extends into the reaction chamber area remote from the connection.

5. Storage cell according to claim 4, wherein the canal is formed by a depression in the partitioning wall.

6. Storage cell according to claim 5, wherein several, equally spaced canals, are distributed over the reaction chamber.

7. Storage cell according to claim 6, wherein the partitioning wall areas disposed between the canals are spaced approximately 0.1 to 1 mm from the solid electrolyte, and wherein the canals have a depth of 1.5 to 10 mm.

8. Storage cell according to claim 6, wherein the partitioning wall areas disposed between the canals are spaced approximately 0.3 to 0.5 mm from the solid electrolyte, and wherein the canals have a depth of 4 to 7 mm.

9. Storage cell accordig to claim 1, wherein the shut-off means has a temperature sensor with a filling which changes its volume upon temperature changes thereby closing and blocking the flow of reactants.

10. Storage cell according to claim 9, wherein the shut-off means including the temperature sensor with filling form one structural unit.

11. Storage cell according to claim 9, wherein the temperature sensor is separate from and connected to the remainder of the shut-off means by a capillary.

12. Storage cell according to claim 10, wherein the shut-off means has elastic, closed bellows which are deformed against their elastic resistance in the axial direction and kept in the deformed position by a filled-in medium which is solid within the range of operating temperatures, clearing the connection, and wherein the medium is subjected to a phase change, i.e. evaporation, melting, when the predetermined temperature is exceeded, releasing the bellows for return into their undeformed position, shutting off the connection.

13. Storage cell according to claim 12, wherein a face of the bellows is a shut-off part with a shut-off cone aligned with the connection.

14. Storage cell according to claim 12, wherein the bellows are deformed by compression.

15. Storage cell according to claim 12, wherein the bellows are deformed by expansion and have at their face a shut-off element supported by a pin.

16. Storage cell according to claim 12, wherein the bellows have in their interior a hook, one end of which is fastened to a face of the bellows and the other end is curved and anchored in the solidified medium.

17. Storage cell according to claim 16, wherein for a predetermined temperature of about 420° C., the medium is zinc (Zn).

18. Storage cell according to claim 12, wherein for a predetermined temperature of about 400° C., the medium is an alloy containing approximately 20 percent by weight silver (Ag), approximately 3 percent by weight copper (Cu), approximately 2 percent by weight zinc (Zn), and the balance tin (Sn).

19. Storage cell according to claim 12, wherein for a predetermined temperature of about 380° C., the medium is sodium bromate ($NaBrO_3$).

20. Storage cell according to claim 12, wherein for a predetermined temperature of approximately 445° C., the medium is lithium iodide (LiI).

21. Storage cell according to claim 1, wherein the shut-off means is fully open within the operating temperature range of the storage cell and shuts off only when the predetermined temperature is reached.

22. Storage cell according to claim 21, wherein, the shut-off means, after shutting off, can no longer be influenced by storage cell temperature changes.

23. Storage cell according to claim 22, wherein the shut-off means has elastic, closed bellows which are deformed against their elastic resistance in the axial direction and kept in the deformed position by a filled-in medium which is solid within the range of operating temperatures, clearing the connection, and wherein the medium is subjected to a phase change, i.e. evaporation, melting, when the predetermined temperature is exceeded, releasing the bellows for return into their undeformed position, shutting off the connection.

* * * * *